United States Patent
Kim et al.

(10) Patent No.: US 8,755,043 B2
(45) Date of Patent: *Jun. 17, 2014

(54) METHOD OF INSPECTING A SUBSTRATE

(75) Inventors: Hee-Tae Kim, Yongin-si (KR); Min-Young Kim, Seoul (KR)

(73) Assignees: Koh Young Technology Inc., Seoul (KR); Kyungpook National University Industry-Academic Cooperation Foundation, Daegu (KR)

( * ) Notice: Subject to any disclaimer, the term of this patent is extended or adjusted under 35 U.S.C. 154(b) by 75 days.

This patent is subject to a terminal disclaimer.

(21) Appl. No.: 13/300,023

(22) Filed: Nov. 18, 2011

(65) Prior Publication Data

US 2012/0127486 A1 May 24, 2012

(30) Foreign Application Priority Data

Nov. 19, 2010 (KR) .................. 10-2010-0115845
Nov. 9, 2011 (KR) .................. 10-2011-0116162

(51) Int. Cl.
  *G01B 11/06* (2006.01)
  *G01B 11/25* (2006.01)

(52) U.S. Cl.
  CPC ........ *G01B 11/2531* (2013.01); *G01B 11/2527* (2013.01)
  USPC ........ 356/237.4; 356/625; 356/630; 356/635; 356/237.5

(58) Field of Classification Search
  CPC .................. G01B 11/2531; G01B 11/2527
  USPC ........... 356/237.1–237.5, 603, 604, 605, 606, 356/619, 621, 610, 625, 627, 628, 630, 634, 356/635

See application file for complete search history.

(56) References Cited

U.S. PATENT DOCUMENTS

| | | | | |
|---|---|---|---|---|
| 5,557,410 A | * | 9/1996 | Huber et al. | 356/604 |
| 5,636,025 A | * | 6/1997 | Bieman et al. | 356/619 |
| 5,646,733 A | * | 7/1997 | Bieman | 356/604 |
| 6,291,817 B1 | * | 9/2001 | Kobayashi et al. | 250/237 G |
| 6,438,272 B1 | * | 8/2002 | Huang et al. | 382/286 |
| 7,286,246 B2 | * | 10/2007 | Yoshida | 356/605 |
| 7,440,590 B1 | * | 10/2008 | Hassebrook et al. | 382/108 |
| 7,545,516 B2 | * | 6/2009 | Jia et al. | 356/603 |
| 2008/0117438 A1 | * | 5/2008 | Quirion et al. | 356/610 |
| 2010/0158322 A1 | * | 6/2010 | Weston et al. | 382/113 |
| 2012/0127461 A1 | * | 5/2012 | Jeong | 356/237.2 |

FOREIGN PATENT DOCUMENTS

| | | |
|---|---|---|
| CN | 101782375 | 7/2010 |
| CN | 101852745 | 10/2010 |
| JP | 07-134013 | 5/1995 |
| JP | 2003-519783 | 6/2003 |

(Continued)

*Primary Examiner* — Sang Nguyen
(74) *Attorney, Agent, or Firm* — Kile Park Reed & Houtteman PLLC

(57) ABSTRACT

A method of inspecting a substrate is disclosed. The method of inspecting a substrate, comprises: obtaining phase data per projecting part with regard to a substrate, by projecting pattern beam onto the substrate having a target object formed thereon through a plurality of projecting parts in sequence; obtaining height data per projecting part with regard to the substrate by using the phase data per the projecting part; compensating tilt of the height data by using the height data per projecting part; modifying the tilt-compensated height data per projecting part; and obtaining integrated height data by using the modified height data.

8 Claims, 6 Drawing Sheets

(56) References Cited

FOREIGN PATENT DOCUMENTS

| JP | 2007-199070 | 8/2007 |
|----|-------------|--------|
| JP | 2008-096124 | 4/2008 |
| JP | 2008-157797 | 7/2008 |
| JP | 2010-243508 | 10/2010 |
| JP | 2011-232279 | 11/2011 |
| KR | 10-2010-0121560 | 11/2010 |
| WO | 01/50760 | 7/2001 |

* cited by examiner

METHOD OF INSPECTING A SUBSTRATE

CROSS REFERENCE TO RELATED APPLICATION

This application claims priorities from the benefit of Korea Patent Application No. 10-2010-0115845, filed on Nov. 19, 2010 and Korean Patent Application No. 10-2011-0116162, filed on Nov. 9, 2011, which is hereby incorporated by references for all purposes as if fully set forth herein.

BACKGROUND OF THE INVENTION

1. Field of the Invention

Exemplary embodiments of the present invention relate to a method of inspecting a substrate or, more particularly, to a method of inspecting a substrate capable of enhancing reliability of a process of inspecting a status of a target object formed on a substrate.

2. Discussion of the Background

In general, an inspection process is required to inspect reliability of a substrate with an electronic device mounted thereon before and after the electronic device is mounted on the substrate. For example, a pad area of a substrate is inspected in order to inspect a status of solder for mounting an electronic device onto the substrate, before the electronic device is mounted on the substrate, and the status of the electronic device is inspected if the electronic device is properly mounted after the electronic device is mounted on the substrate.

Recently, a method of inspecting a substrate has been used for inspecting three dimensional shape of a target object by using an apparatus of inspecting three dimensional shape, which includes a plurality of projecting parts, each of which includes a light source and a grating to project pattern light onto the target object, and a camera capturing an image of the target object.

In order to inspect the three dimensional shape of the target object, height data of the target object is required. The height data is obtained by multiplying a scale factor to the measured phase data. Further, when a plurality of projecting parts is used, all data measured by each of the projecting parts are merged to generate the height data.

However, each of the projecting parts irradiates different pattern light, so that phase data measured by using the projection part is different. Further, the height should be measured based on a reference corresponding to reliable ground, with regard to a plurality of projecting part in order to obtain reliable height without noise per projecting part. However, there is no way of excluding noise data. Additionally, when a target object is an electronic device with height, there exists a shadow induced by the electronic device, which makes effect data of the ground area insufficient, so that reliability of the height of the target object is lowered. Further, there may be tilt in measurement data in accordance with environment of the substrate to induce deviation between the projecting parts, so that reliability of the integrated height data is lowered.

SUMMARY OF THE INVENTION

Therefore, exemplary embodiments of the present invention provide a method of inspecting a substrate, which is capable of improving reliability of integrated height data by compensating tilt of measurement data per projecting part before modifying height data.

Further, exemplary embodiments of the present invention provide a method of inspecting a substrate, which is capable of improving accuracy and reliability of inspection by setting up noise area per projecting part and excluding height data of the noise area before obtaining integrated height data.

Additional features of the invention will be set forth in the description which follows, and in part will be apparent from the description, or may be learned by practice of the invention.

An exemplary embodiment of the present invention discloses a method of inspecting a substrate, comprising: obtaining phase data per projecting part with regard to a substrate, by projecting pattern beam onto the substrate having a target object formed thereon through a plurality of projecting parts in sequence; obtaining height data per projecting part with regard to the substrate by using the phase data per the projecting part; compensating tilt of the height data by using the height data per projecting part; modifying the tilt-compensated height data per projecting part; and obtaining integrated height data by using the modified height data.

For example, modifying the tilt-compensated height data per projecting part may be performed based on height data of projecting part with best reliability among the a plurality of projecting parts.

For example, the reliability of the projecting part may be evaluated through visibility and gray scale information that are functions having height, signal to noise ratio (SNR), amplitude, average intensity as a parameter.

For example, modifying the tilt-compensated height data per projecting part, may be performed with a reference to a ground area of the substrate.

For example, modifying the tilt-compensated height data per projecting part, may be performed with a reference to total area of substrate on which the target object is formed.

For example, modifying the tilt-compensated height data per projecting part, may be performed with a reference to a selected area with relatively high reliability in the total area of the substrate.

For example, modifying the tilt-compensated height data per projecting part, may comprise: selecting a representative ground height among the modified height data per projecting part; and modifying the modified height data per projecting part again such that the representative ground height becomes zero.

For example, prior to obtaining the height data per projecting part, the method may further comprise: setting up a ground area of the substrate; setting up phase data with largest frequency number as the representative ground phase, with regard to each of the projecting parts; and shifting the phase data per projecting part such that the representative ground phase becomes zero, with regard to each of the projecting parts.

Another exemplary embodiment of the present invention discloses a method of inspecting a substrate, comprising: irradiating pattern light toward a substrate on which a target object is formed through a plurality of projecting parts in sequence, and capturing reflected image per projecting part through camera; setting up a noise area regarding to each of the projecting parts by using the reflected image per the projecting part; obtaining phase data per projecting part, regarding to the substrate by using the reflected image per the projecting part; obtaining height data per projecting part, regarding to the substrate by using the phase data per projecting part; merging the height data per projecting part to get integrated height data; compensating tilt of the integrated height data on a basis of inclination of ground area adjacent to the target object; and obtaining height of the target by using the tilt-compensated integrated height data.

For example, setting up a noise area, may be performed by using at least one of gray scale information and visibility information, regarding to the reflected image per the projecting part.

For example, merging the height data per projecting part to get integrated height data, may be performed based on height data of effective pixels, wherein the noise area is excluded from the height data per projecting part.

For example, the integrated height data may correspond to the height data per projecting part with minimum value. For example, the integrated height data may be selected, by the height data with relatively smaller value when the height difference of the height data per projecting part in the ground area is equal to or greater than a predetermined reference value, and by the plurality of the height data per projecting parts when the height difference of the height data per projecting part in the ground area is smaller than the predetermined reference value.

Still another exemplary embodiment of the present invention discloses a method of inspecting a substrate, comprising: irradiating pattern light toward a substrate on which a target object is formed through a projecting part to obtain phase data of the substrate; obtaining height data of the substrate by using the phase data; defining a target object area in which the target object is formed, and a ground area in the substrate; compensating tilt of height data by using height data corresponding to the ground area; and obtaining height of the substrate, based on the tilt-compensated height data.

According to the method of inspecting a substrate, the reliability of the integrated height data may be improved by compensating tilt of measurement data per projecting part before modifying height data obtained by using a plurality of projecting parts.

Further, when merging height data of a plurality of projecting parts, the height data per projecting part is modified to improve reliability of the integrated height data.

Further, in obtaining the integrated height data of the substrate having a target object formed thereon by using a plurality of projecting parts, the target object area and the ground area are separated, and the integrated height data, regarding to each area, is obtained to improve accuracy and reliability of inspection.

Additionally, before obtaining the integrated height data, the noise area is set up per each projecting part, and the height data of the noise area is exclude in obtaining the integrated height, so that accuracy and reliability of inspection may be further improved.

Further, in obtaining the height of the substrate having the target object formed thereon, by using the projecting part, error of the ground phase is compensated, so that and reliability of inspection may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
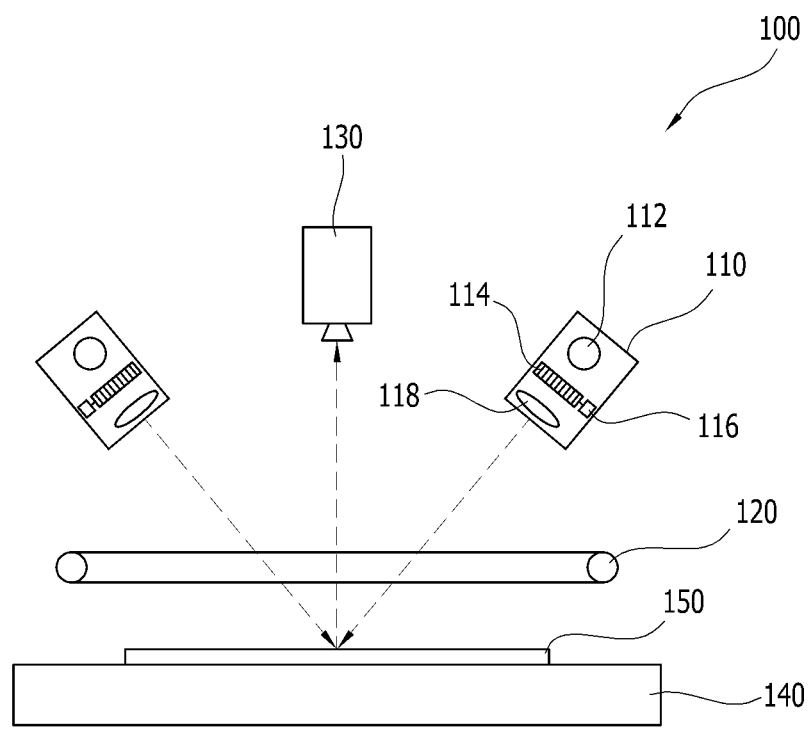
FIG. 1 is a schematic view showing a substrate-inspecting apparatus.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, the present invention will be explained in detail, referring to figures.

FIG. 1 is a schematic view showing a substrate-inspecting apparatus.

Referring to FIG. 1, a substrate-inspecting apparatus 100 according to an exemplary embodiment of the present invention includes a stage 140 supporting and transferring a substrate 150 on which a target object is formed, a plurality of projecting parts 110 projecting a pattern light onto the substrate 150 and a camera 130 capturing an image of the substrate 150. Alternatively, the substrate-inspecting apparatus 100 may further include an illuminating part 120 disposed adjacent to the stage 140 to illuminate the substrate 150 as distinct from the projecting parts 110.

The projecting parts 110 projects pattern light toward the substrate 150 in order to measure three dimensional shape of the target object formed on the substrate 150. For example, projecting part 110 includes a light source 112 generating light, a grating 114 transferring the light generated by the light source 112 into pattern light, a grating shifter 116 shifting the grating 114 and a lens 118 focusing the pattern light transformed by the grating 114 to the target object. The grating 114 may be shifted by $2\pi/N$ (N is a natural number more than two) for shifting phase of the pattern light through the grating shifter 116 such as a piezo actuator (PZT). The projecting parts 110 with the above mentioned structure are disposed along a circumference with reference to the camera 130 such that the projecting parts 110 are spaced apart from each other to enhance accuracy. The plurality of projecting parts 110 are disposed in an inclined direction with respect to the substrate 150 to project pattern light toward the substrate 150 in a plurality of directions.

The illuminating part 120 may have a circular shape and be disposed adjacent to the stage 140. The illuminating part 120 illuminates the substrate 150 for initial alignment of the substrate 150 or setting inspection area. For example, illuminating part 120 may include a fluorescent lamp generating white light, or a red LED, a green LED and a blue LED generating red light, green light and blue light, respectively.

The camera 130 captures images of the substrate 150 when the projecting part 110 projects pattern light toward the substrate 150, and when the substrate 150 is illuminated by the illuminating part 120. For example, the camera 130 is disposed directly over the substrate 150. The camera 130 may include a CCD camera or a CMOS camera.

The substrate-inspecting apparatus 100 having the above mentioned structure measures three dimensional image and two dimensional image by capturing images through the camera 130 when the projecting part 110 projects pattern image toward the substrate 150 and when the substrate 150 is illuminated by the illuminating part 120, respectively.

When the plurality of projecting parts 110 are adopted by the substrate-inspecting apparatus 100, data such as phase data and height data measured by each of the plurality of projecting parts 110 may be different from each other due to deviation of position and characteristics. Therefore, it is required to merge the data corresponding to the plurality of projecting parts 110 in order to obtain exact integrated height data of the target object formed on the substrate 150.

Figure 2:
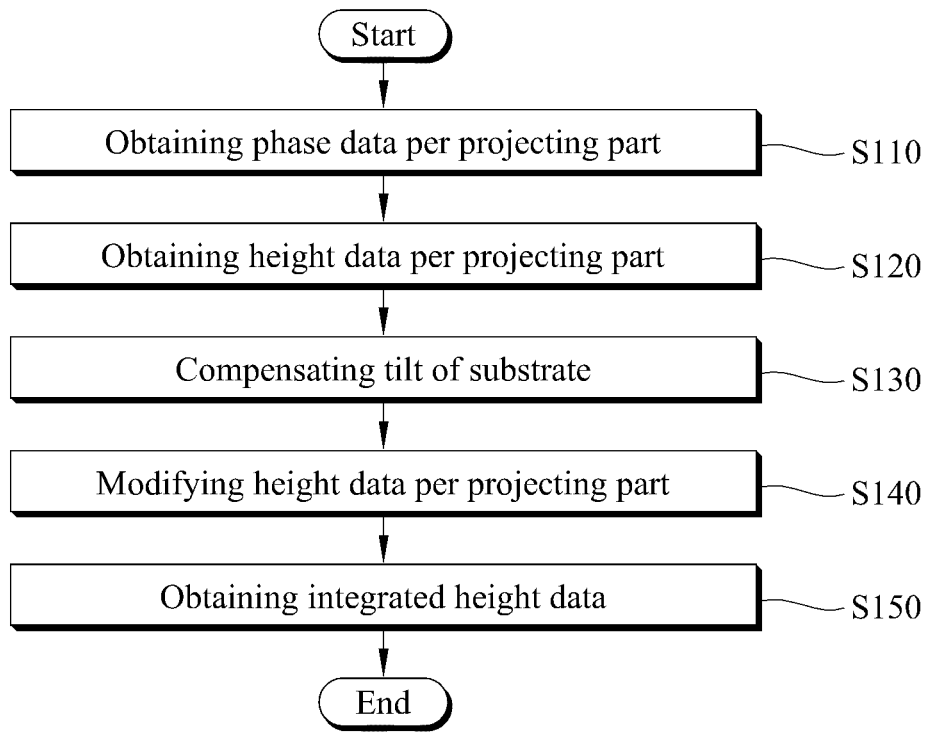
FIG. 2 is a flow chart showing a method of inspecting a substrate according to an exemplary embodiment of the present invention.
Figure 3:
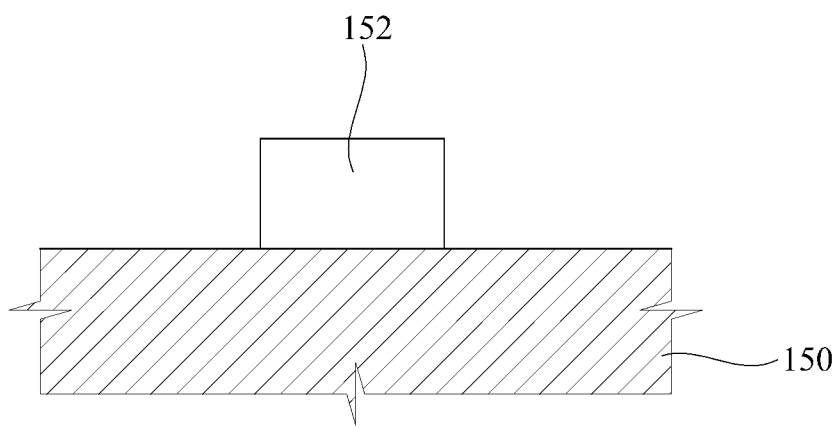
FIG. 3 is a cross sectional view showing a substrate on which a target object is formed thereon.

FIG. 2 is a flow chart showing a method of inspecting a substrate according to an exemplary embodiment of the present invention, and FIG. 3 is a cross sectional view showing a substrate on which a target object is formed thereon.

Referring to FIG. 1, FIG. 2 and FIG. 3, in order to obtain the integrated height data of the substrate 150 with the target object 152, phase data per the projecting part are obtained by projecting pattern light toward the substrate 150 with the target object 152, shifting the phase of the pattern light through the plurality of projecting parts 110 (S110).

In detail, when one of the plurality of projecting parts 110 projects pattern light toward the substrate 150, shifting the phase of the pattern image, the camera 130 captures an image in sequence, and other one of the plurality of projecting parts 110 and the camera 130 perform the same process to obtain the phase data per projecting part. For example, the substrate-inspecting apparatus 100 may obtain the phase data per projecting part through the phase-shift moiré method. For example, after projecting pattern light toward the substrate 150 N-times, shifting the phase of the pattern light by each of the projecting part 110 and capturing images of the substrate 150, the phase data per projecting part is obtained by using the images through N-bucket algorithm.

Then, a height data per projecting part, which regards to the substrate 150 with the target object 152, is obtained by using the phase data per the projecting parts (S120). For example, the height data per the projecting parts may be obtained by multiplying a scale factor corresponding to each projecting part 110 to the phase data per projecting part.

Then, the tilt in a measurement data is compensated by using height data per projecting part (S130).

Figure 4A:
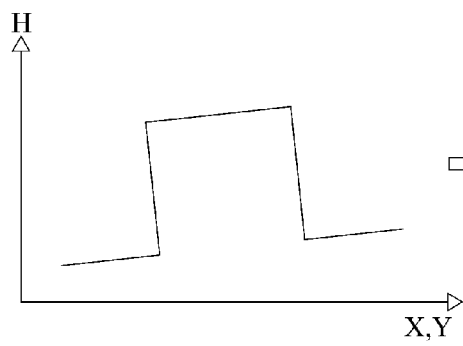
FIG. 4A and FIG. 4B are conceptual view showing a process of tilt-compensation.
Figure 4B:
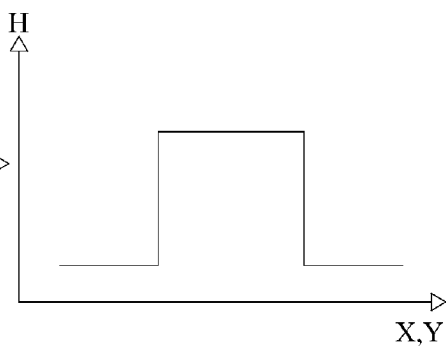

FIG. 4A and FIG. 4B are conceptual view showing a process of tilt-compensation.

Referring to FIG. 3, FIG. 4A and FIG. 4B, a ground area of the substrate, in which the target object 152 does not exist, may have a wiring pattern, a silk screen pattern, photoresist, etc., formed thereon, which induce noises. Therefore, there may be somewhat tilt in measurement data due to the noises. Since the plurality of projecting parts 110 project pattern light in different positions, respectively, there may be deviation in height data obtained through each projecting part 110 due to tilt of measurement data. When height data per projecting part is obtained without considering the tilt of the measurement data, height data of the tilted target object is obtained referenced by representative ground phase or representative ground height regarding to the tilted ground area data to induce error in height data, so that reliability of inspection is lowered.

Therefore, before modifying height data per projecting part, it is required to compensate height distortion induced by the tilt of measurement data of the substrate 150, which is formed through each of the projecting part 110. In order for that, tilt of a relatively flat ground area per projecting part 110 is determined, and then the ground area is compensated through coordination transformation such that inclination thereof becomes zero. For example, the tilt of the ground area may be determined by heights of at least three points in the ground area. On the other hand, in determining tilt of the measurement data, the tilt may be determined not only the ground area but also by the target object area. That is, when an electronic device corresponding to the target object is flat, the tilt of the measurement data may be determined by determining the tilt of upper area of the electronic device.

In this case, the tilt of the measurement data cannot be determined by using the phase data measured through each of the projecting part 110. Therefore, the phase data measured through each of the projecting part 110 is transformed into the height data, and then the tilt of the measurement data is determined and compensated based on the transformed height data.

On the other hand, in case of a substrate-inspecting apparatus adopting only one projecting part 110, the reliability of the height data that is finally obtained may be improved by performing the tilt compensation of the measurement data.

When the modification of tilt of the measurement data, tilt-compensated height data per projecting part are modified (S140).

Figure 5A:
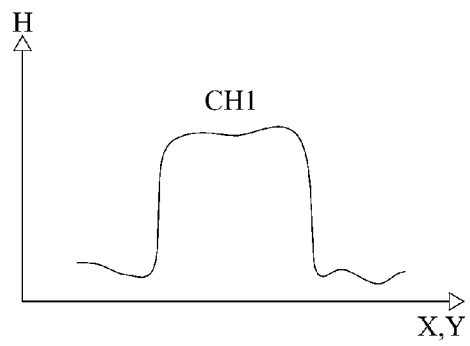
FIG. 5A and FIG. 5B show tilt-compensated height data of a first projecting part and a second projecting part, respectively.
Figure 5B:
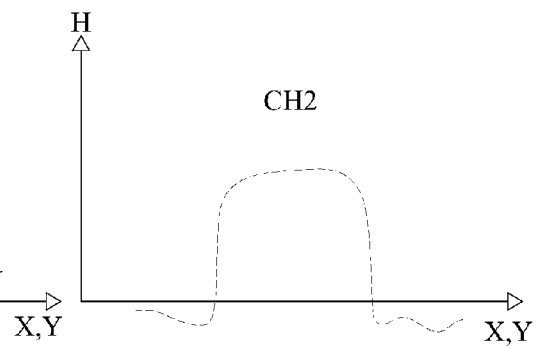

FIG. 5A and FIG. 5B show tilt-compensated height data of a first projecting part and a second projecting part, respectively.

Referring to FIG. 3, FIG. 5A and FIG. 5B, according to the height data per projecting part that is tilt-compensated, there exists deviation between the height data per projecting part due to the noise data. In FIG. 5A and FIG. 5B, only two height data per projecting part are shown for convenience of explanation, but the number of the height data per projecting part may increase as the number of the projecting parts 110 increases.

Therefore, in order to merge the height data per projecting part corresponding to the plurality of projecting parts 110 to get the integrated height data, the height data per projecting part with different deviation are required to be modified.

In order to modify the height data per projecting part, height data of a projecting part with best reliability is selected, and then, height data of remaining projecting part is modified with reference to the height data of the projecting part with best reliability. The reliability of the projecting parts 110 may be evaluated by using at least one of visibility information and gray scale information that are functions having height, signal to noise ratio (SNR), amplitude, average intensity as a parameter. In real case, the image per projecting part captured by the camera 130 includes a physical noise area induced by an alien substance, translucent area, etc., or a noise area induced by exceeding the normal distribution of intensity, and the noise area may be different according to the projecting part to induce distortion in measuring height of the target object 152. Therefore, after obtaining the noise area by using the visibility information and the gray scale information that are functions of parameter with height, signal to noise ratio (SNR), amplitude, average intensity that are obtained per the projecting part 110, a projecting part 110 with least noise area is set to be the reference projecting part.

Figure 6:
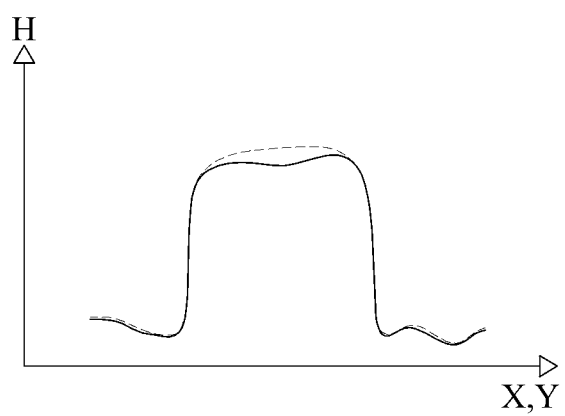
FIG. 6 shows height data per projecting part, which is modified.

FIG. 6 shows height data per projecting part, which is modified.

Referring to FIG. 5A, FIG. 5B and FIG. 6, when a first projecting part (CH1) is set to be the reference projecting part as a result of reliability evaluation regarding to the projecting parts 110, the height data of the remaining projecting part (CH2) is modified with reference to the height of the first projecting part (CH1). For example, after obtaining deviation of the height data of the remaining projecting part (CH2) with reference to the height data of the reference projecting part (CH1), the height data of the remaining projecting part (CH2) is modified by subtracting the deviation from the height data of the remaining projecting part (CH2).

On the other hand, in modifying the height data of remaining projecting part (CH2) with reference to the height data of the reference projecting part (CH1), it is required to determine what area is the reference.

As an exemplary example, the height data per projecting part may be modified with reference to the ground area of the substrate 150. For example, after obtaining the representative height of the ground area of the reference projecting part (CH1) and the representative height of the ground area of the remaining projecting part (CH2), respectively, the representative height of the ground area of the remaining projecting part (CH2) is modified to be the same as the representative height of the ground area of the reference projecting part (CH1).

On the other hand, the height data per projecting part may be modified with reference to total area of the substrate 150 having the target object 152 formed thereon. That is, the height data per projecting part may be modified on a basis of a shape of height data over total area of the substrate 150.

Further, an area with relatively high reliability is selected in the total area of the substrate 150, and then the height data per projecting part may be modified with reference to the selected area. That is, the reliability of the total area is firstly investigated. Then, an area with relatively less noise to have relatively high reliability is selected, and the height data per projecting part may be modified with reference to the area.

On the other hand, an operator may manually select the reference area that is to be the reference of modification may be performed, or the reference area may be selected automatically by calculating the height variation in each area. That is, by calculating the spatial height variation of the total area of the substrate 150 live in real time, an area of less height variation is may be used. Alternatively, when the total area has small height variation, the total area may be used.

After the height data per projecting part is modified, the integrated height data regarding the substrate 150 having the target object 152 formed thereon is obtained by using the modified height data (S150). The integrated height data may be obtained by averaging, weighted averaging or logical median of the modified height data.

As described above, according to an exemplary embodiment of the present invention, the height data per projecting part is modified, and then data with relatively high reliability is selectively used by using the modified height data so that the reliability of the integrated height data may be improved.

On the other hand, before obtaining the integrated height data, the modified height data per projecting part may be modified again such that the height of the ground area becomes zero, in order to obtain the height of the target object 152. In order for that, after obtaining the representative ground height of the ground area from the modified data per projecting part, the modified height data per projecting part is modified again such that the representative ground height becomes zero. As described above, the integrated height data is obtained by using the doubly modified height data per projecting part, so that the integrated height data of the target object 152 may be obtained.

On the other hand, before obtaining the height data per the projecting parts, the phase data per projecting part 110 may be modified. In order for that, a target object area where the target object 152 is formed and a ground area where the target object 152 is not formed are set in the substrate 150. For example, setting the target object area and the ground area may be performed based on the image data obtained by receiving light irradiated toward and reflected by the substrate 150, or based on the reference data of the substrate 150. Alternatively, the target object area and the ground area may be set in an inspection area which is previously set in the substrate 150.

CAD data containing basic information regarding to the substrate 150 may be used as the reference data. Further, design data for manufacturing PCB, manufacturing data, gerber data, PCB design file, various data (ODB++ or extraction file per each CAD design tool) of standard and non-standard type, which is extracted from the PCB design file may be used as the reference data. Additionally, information obtained from image file of a bare board or a mounting board, which is captured by a camera, may be used as the reference data. The reference data contains position information of a pad, a conducting pattern, a via hole, a target object, etc. formed on the substrate 150. Therefore, by using the reference data, the ground area of the substrate 150 may be estimated and set.

Then, the phase data of the ground area, of which frequency number is largest, is set to be a representative ground phase in regards to each of the projecting parts 110. Then, the phase data per the projecting part is shifted such that the representative ground phase becomes zero by subtracting the representative ground phase from the phase data per the projecting parts in regards to each of the projecting parts 110. As described above, when the phase of the ground area is adjusted to be zero in regards to each of the phase data per projecting part before modifying the height data per projecting part, the reliability of the integrated height data that is finally obtained may be highly improved.

According to the present embodiment, before modifying the height data of each of the plurality of projecting parts, the tilt regarding the data measured by each of the projecting parts is compensated to improve reliability of the integrated height data. Further, instead of modifying the phase data, the height data of the plurality of projecting parts is modified, respectively so that the reliability of the integrated height data may be improved.

Figure 7:
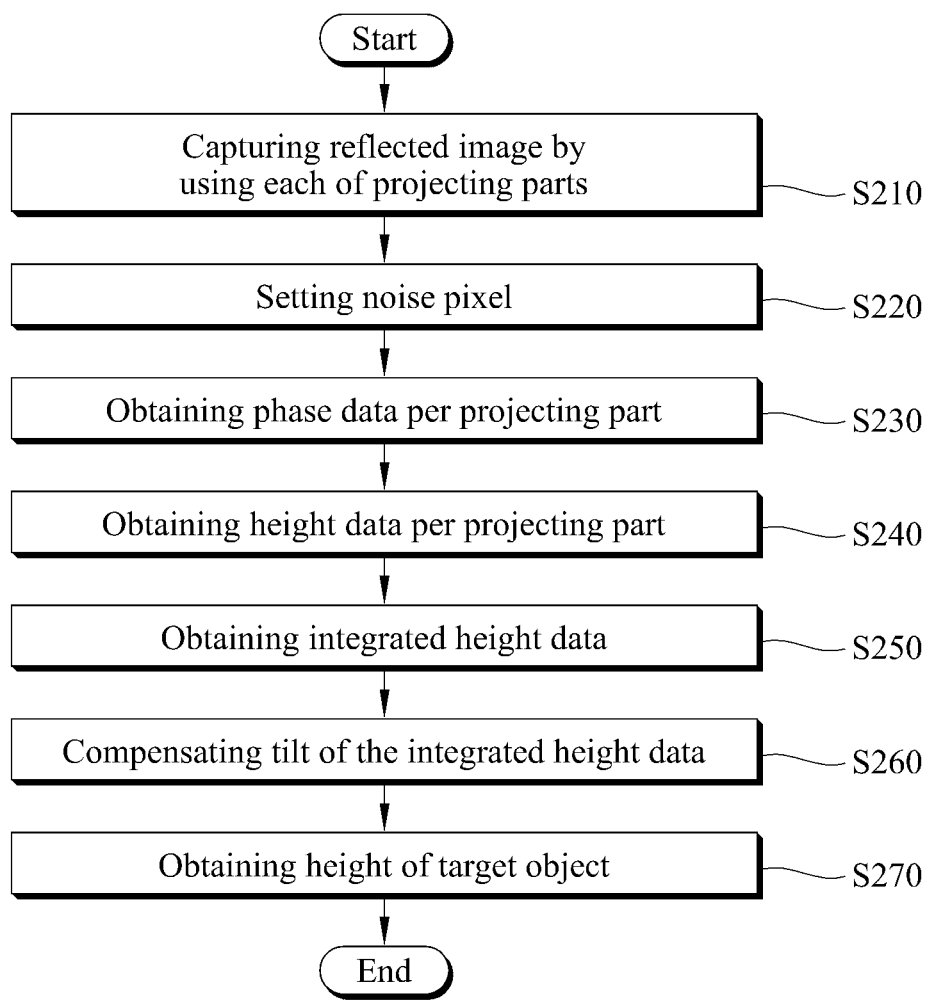
FIG. 7 is a flow chart showing a method of inspecting a substrate according to another exemplary embodiment of the present invention.

FIG. 7 is a flow chart showing a method of inspecting a substrate according to another exemplary embodiment of the present invention.

Referring to FIG. 1, FIG. 3 and FIG. 7, in order to inspect the substrate 150 having the target object 152 formed thereon, the a plurality of projecting parts 110 projects pattern light toward the substrate 150 in sequence, and the camera 130 captures reflected images per the projecting part (S210).

Then, a noise area regarding to each of the projecting parts 110 is set up by using the reflected images per the projecting part (S220). The noise area may be set up by using at least one of the gray information and the visibility regarding to the reflected image per projecting part. For example, the area of which gray scale average is equal to or lower than 10 and equal to or higher than 230 and of which visibility is equal to or lower than 0.3 may be set up as the noise area.

Then, the phase data per projecting part, which regard to the substrate 150, is obtained by using the reflected image per projecting part (S230). In this case, the substrate-inspecting apparatus 100 may obtain the phase data per projecting part through the phase-shift moirémethod. For example, after projecting pattern light toward the substrate 150 N-times, shifting the phase of the pattern light by each of the projecting part 110 and capturing images of the substrate 150, the phase data per projecting part is obtained by using the images through N-bucket algorithm.

Then, a height data per projecting part, which regards to the substrate 150 with the target object 152, is obtained by using the phase data per the projecting parts (S240). For example, the height data per the projecting parts may be obtained by multiplying a scale factor corresponding to each projecting part 110 to the phase data per projecting part.

Then, the integrated height data is obtained by merging the height data per projecting part (S250). The height data of the target object area corresponds to a plurality of pixels in the target object area, so that the integrated height data may be obtained on the basis of the height data of only pixels corresponding to the effective area, excluding the noise area from the height data per projecting part. For example, in case that the number of the projecting part 110 is two, the integrated height data is obtained on the basis of the height data of the two projecting parts 110 when the height data of the two projecting part are effective. On the other hand, the integrated height data is obtained on the basis of the height data of effective area, disregarding the height data of a noise area, when only one o the height data of the two projecting part is effective. Further, when the height data of the two projecting parts 110 correspond to noise area, the corresponding area is treated as a noise area. When the corresponding area is treated as a noise area, the integrated height data may be obtained on the basis of the height data of effective area in neighboring areas. In this case, the integrated height data may be obtained by using at least one of method of averaging, weighted averaging and logical median of a plurality of height data.

On the other hand, the integrated height data of a ground area near the target object 152 corresponds to a plurality of pixels, and the height data per projecting part, having minimum value may be selected as the integrated height data.

Figure 8:
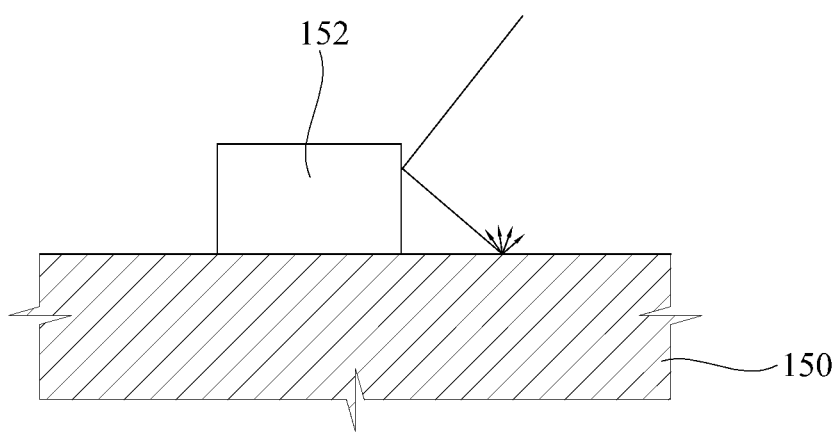
FIG. 8 is a cross-sectional view of a substrate in order to explain the reason of noise in a ground area.
Figure 9:
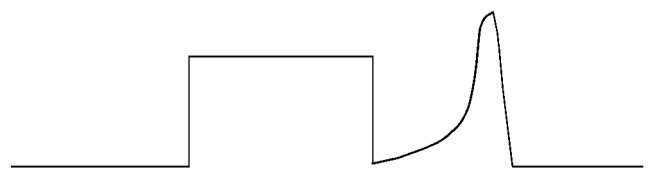
FIG. 9 is a diagram showing the height data corresponding to the substrate in FIG. 8.

FIG. 8 is a cross-sectional view of a substrate in order to explain the reason of noise in a ground area, and FIG. 9 is a diagram showing the height data corresponding to the substrate in FIG. 8.

Referring to FIG. 1, FIG. 8 and FIG. 9, pattern light advancing toward the target object 152 may be reflected by the target object 152 to advance toward the ground area of the substrate 150, and may be diffusedly reflected by the substrate 150. For example, as shown in FIG. 8, when pattern light is irradiated by a projecting part (not shown) disposed right side of the target object 152, the pattern light is reflected by the target object 152 to advance in a right direction to be diffusedly reflected on the substrate 150. As a result, as shown in FIG. 9, a ground area where the diffused reflection happens is measured to be a right region, so that the phase corresponding to the ground area is distorted. As a result, the height data corresponding to the phase becomes noise.

On the contrary, when pattern light is irradiated toward the target object 152 by a projecting part disposed left side of the target object 152, the diffused reflection does not happen in the above ground area.

Therefore, when the pattern light is irradiated from the right side of the target object 152 toward the left side of the target object 152, the obtained height data of the ground area disposed at the right side of the target object 152 is inaccurate, compared with the obtained height data of the ground area disposed at the right side of the target object 152 when the pattern light is irradiated from the left side of the target object 152 toward the right side of the target object 152. That is, the height data with relatively greater value among the obtained height data acquired by pattern light irradiated by projecting parts 110 in different directions, can be seen as a noise.

Therefore, in order to exclude the height data of a projecting part 110 corresponding to pattern light generating noise, the minimum height data per projecting part among the height data per projecting part, which corresponds to the ground area, may be selected as the integrated height data of the ground area.

For example, when the number of the projecting part 110 is two, the height data with relatively greater value among the height data obtained through the two projecting parts 110 may be a noise, so that the height data with relatively smaller value among the height data obtained through the two projecting parts 110 may be selected as the integrated height data of the ground area.

Alternatively, when the height difference of the height data per projecting part in the ground area is equal to or greater than a predetermined reference value, the height data with relatively smaller value may be selected as the integrated height data of the ground area, and, when the height difference of the height data per projecting part in the ground area is smaller than the predetermined reference value, the integrated height data may be obtained by the plurality of the height data per projecting parts. That is, when the height difference of the height data per projecting part in the ground area is equal to or greater than a predetermined reference value, the height data per projecting part with relatively high value is regarded as a noise. In this case, the integrated height data may be obtained through at least one of averaging, weighted averaging and logical median of a plurality of height data in which noise area is excluded.

Then, the tilt of the integrated height data is compensated on the basis of the ground area adjacent to the target object 152 (S260). Here, the tilt-compensation of the integrated height data may be performed through the same process as explained referring to FIG. 4. Therefore, any repetitive explanation will be omitted.

Then, the height of the target object 152 is calculated by using the integrated height data that is tilt-compensated (S270).

As described above, in obtaining the integrated height data of the substrate having a target object is formed thereon by using a plurality of projecting parts, the target object area and the ground area are divided, and the integrated height data regarding to the target object area and the ground area are obtained, so that accuracy and reliability of inspection may be improved. Additionally, before obtaining the integrated height data, the noise area is set up per each projecting part, and the integrated height data is obtained, excluding the height data of the noise area, so that accuracy and reliability of inspection may be further improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of inspecting a substrate, comprising:
obtaining phase data per projecting part with regard to the substrate by projecting pattern beam onto the substrate having a target object formed thereon through a plurality of projecting parts in sequence;
obtaining height data per projecting part with regard to the substrate by using the phase data per projecting part;
compensating tilt of the height data per projecting part;
modifying the tilt-compensated height data per projecting part; and
obtaining, using a processor, integrated height data by using the modified height data per projecting part,
wherein the modifying the tilt-compensated height data per projecting part comprises:
selecting a representative ground height among the modified height data per protecting part; and
modifying the modified height data per protecting part again such that the representative ground height becomes zero.

2. The method of inspecting a substrate of claim 1, wherein the modifying the tilt-compensated height data per projecting part is performed based on height data of a projecting part with a best reliability among the plurality of projecting parts.

3. The method of inspecting a substrate of claim 2, wherein the reliability of the projecting part is evaluated through visibility and gray scale information that are functions having height, signal to noise ratio (SNR), amplitude, average intensity as a parameter.

4. The method of inspecting a substrate of claim 1, wherein the modifying the tilt-compensated height data per projecting part is performed with a reference to a ground area of the substrate.

5. The method of inspecting a substrate of claim 1, wherein the modifying the tilt-compensated height data per projecting part is performed with a reference to a total area of the substrate on which the target object is formed.

6. The method of inspecting a substrate of claim 1, wherein the modifying the tilt-compensated height data per projecting part is performed with a reference to a selected area with a relatively high reliability in a total area of the substrate.

7. The method of inspecting a substrate of claim 1, prior to obtaining the height data per projecting part, further comprising:
setting up a ground area of the substrate;
setting up phase data with a largest frequency number as a representative ground phase, with regard to each of the projecting parts; and
shifting the phase data per projecting part such that the representative ground phase becomes zero, with regard to each of the projecting parts.

8. A method of inspecting a substrate, comprising:
irradiating pattern light toward the substrate on which a target object is formed through a projecting part to obtain phase data of the substrate;
obtaining height data of the substrate by using the phase data;
defining a target object area in which the target object is formed, and a ground area in the substrate;
compensating tilt of the height data by using height data corresponding to the ground area; and
obtaining, using a processor, height of the substrate based on the tilt-compensated height data,
wherein the modifying the tilt-compensated height data per projecting part comprises:
selecting a representative ground height among the modified height data per protecting part; and
modifying the modified height data per projecting part again such that the representative ground height becomes zero.

* * * * *